United States Patent
Guo et al.

(10) Patent No.: US 9,112,716 B2
(45) Date of Patent: Aug. 18, 2015

(54) METHOD AND SYSTEM FOR OBTAINING ACCESS INFORMATION AND CHARGING IN MULTIMEDIA BROADCAST/MULTICAST SERVICE

(75) Inventors: Wenjie Guo, Shenzhen (CN); Zhihai Wang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 161 days.

(21) Appl. No.: 13/258,237

(22) PCT Filed: Jan. 13, 2010

(86) PCT No.: PCT/CN2010/070157
§ 371 (c)(1),
(2), (4) Date: Nov. 1, 2011

(87) PCT Pub. No.: WO2010/127564
PCT Pub. Date: Nov. 11, 2010

(65) Prior Publication Data
US 2012/0033602 A1    Feb. 9, 2012

(30) Foreign Application Priority Data
May 5, 2009 (CN) .......................... 2009 1 0137543

(51) Int. Cl.
*H04L 12/18* (2006.01)
*H04W 72/00* (2009.01)
(Continued)

(52) U.S. Cl.
CPC .......... *H04L 12/189* (2013.01); *H04L 12/1485* (2013.01); *H04M 15/41* (2013.01);
(Continued)

(58) Field of Classification Search
CPC ... H04L 12/189; H04L 12/1485; H04W 4/06; H04W 4/24; H04W 72/005; H04W 76/002; H04M 15/41; H04M 15/43; H04M 15/57; H04M 15/80; H04M 15/8022

USPC ........................................................ 370/312
See application file for complete search history.

(56) References Cited

U.S. PATENT DOCUMENTS 7,801,510 B2 *  9/2010  Jung et al. ...................... 455/411
8,566,455 B1 * 10/2013  Zhao et al. ..................... 709/227
(Continued)

FOREIGN PATENT DOCUMENTS

CN         101052144 A       10/2007
CN         101106508 A        1/2008
(Continued)

OTHER PUBLICATIONS

ETSI, TS 132 271 V7.1.0, Jan. 2009, Multimedia Broadcast and Multicast Service (MBMS) charging (3GPP TS 32.273 version 7.1.0 Release 7), p. 14-17, total 40 pages.*
(Continued)

*Primary Examiner* — Brian J Gillis
*Assistant Examiner* — Amy Ling
(74) *Attorney, Agent, or Firm* — Oppedahl Patent Law Firm LLC (57) ABSTRACT

The present invention discloses a method and system for obtaining access information in a Multimedia Broadcast/Multicast Service (MBMS). The method includes the following steps: during an eMBMS session, a broadcast/multicast service center (BM-SC) configures access information in one or more MBMS session signaling, and sends the MBMS session signaling to an MBMS gateway within a service area of the BM-SC; wherein the access information at least includes radio access technology type information. The present invention also discloses a method and system for charging in an MBMS. The methods and systems of the present invention can take the access information including the radio access technology type as the basis of charging, supply communication operators with a charging manner of distinguishing radio access technology types, and adopt different rates corresponding to the MBMS service areas of different radio access technology types, and thus charging can be further detailed.

15 Claims, 5 Drawing Sheets

(51) Int. Cl.
*H04L 12/14* (2006.01)
*H04M 15/00* (2006.01)
*H04W 4/24* (2009.01)
*H04W 76/00* (2009.01)

(52) U.S. Cl.
CPC .............. *H04M 15/43* (2013.01); *H04M 15/57* (2013.01); *H04M 15/80* (2013.01); *H04M 15/8022* (2013.01); *H04W 4/24* (2013.01); *H04W 72/005* (2013.01); *H04W 76/002* (2013.01)

(56) References Cited

U.S. PATENT DOCUMENTS

| | | | | |
|---|---|---|---|---|
| 2007/0060101 | A1* | 3/2007 | Duan | 455/406 |
| 2007/0066286 | A1* | 3/2007 | Hurtta | 455/414.1 |
| 2007/0249352 | A1* | 10/2007 | Song et al. | 455/436 |
| 2007/0275742 | A1* | 11/2007 | Zhang | 455/466 |
| 2008/0101376 | A1 | 5/2008 | Do et al. | |
| 2008/0155055 | A1* | 6/2008 | Shan et al. | 709/217 |
| 2008/0293399 | A1* | 11/2008 | Xu et al. | 455/422.1 |
| 2009/0129342 | A1* | 5/2009 | Hwang et al. | 370/331 |
| 2009/0199268 | A1* | 8/2009 | Ahmavaara et al. | 726/1 |
| 2009/0264097 | A1* | 10/2009 | Cai et al. | 455/406 |
| 2010/0027541 | A1* | 2/2010 | Eriksson et al. | 370/390 |
| 2010/0150046 | A1* | 6/2010 | Li et al. | 370/311 |
| 2010/0265866 | A1* | 10/2010 | Chao et al. | 370/312 |
| 2011/0085489 | A1* | 4/2011 | Rydnell et al. | 370/312 |

FOREIGN PATENT DOCUMENTS

| | | | |
|---|---|---|---|
| CN | 101110996 A | | 1/2008 |
| CN | 101170828 A | * | 4/2008 |
| EP | 1753165 A1 | | 2/2007 |

OTHER PUBLICATIONS

ZTE, Change Request, "RAT type for eMBMS", Mar. 5, 2009, 3GPP TSG-SA WG2 Meeting #73, p. 1, total 4 pages.*
NP-040335, "New sub-attributes 3GPP VSA passed on the Gi interface for charging purposes", Sep. 2004, 3GPP "TSG-CN MW3", p. 5, 14 pages.*
International Search Report in international application No. PCT/CN2010/070157, mailed on Apr. 15, 2010.
English Translation of the Written Opinion of the International Search Authority in international application No. PCT/CN2010/070157, mailed on Apr. 15, 2010.
"3rd Generation Partnership Project; Technical Specification Group Services and System Aspects; Multimedia Broadcast/Multicast Service (MBMS); Architecture and functional description (Release 9)", 3GPP Standard; 3GPP TS 23.246, 3rd Generation Partnership Project (3GPP), Mobile Competence Centre; 650, Route des Lucioles; F-06921 Sophia-Antipolis Cedex, France, No. V9.0.0, Mar. 1, 2009. (57 pages—see Supplementary European Search Report in European application No. 10771967.6 for relevant pages).
"3rd Generation Partnership Project;Technical Specification Group Services and System Aspects; Telecommunication management; Study on Charging Management; 3GPP Evolved Packet Core (EPC): Charging aspects (Release 8)", 3GPP Draft; 32820-200, 3rd Generation Partnership Project (3GPP), Mobile Competence Centre; 650, Route des Lucioles; F-06921 Sophia-Antipolis Cedex, France, vol. TSG SA, no. Mexico, Nov. 14, 2007. (31 pages—see Supplementary European Search Report in European application No. 10771967.6 for relevant pages).
ZTE et al: "RAT type for eMBMS", 3GPP Draft; RAT Type for eMBMS, 3rd Generation Partnership Project (3GPP), Mobile Competence Centre; 650, Route des Lucioles, F-06921 Sophia-Antipolis Cedex; France, no. Tallinn; May 5, 2009. (4 pages—see Supplementary European Search Report in European application No. 10771967.6 for relevant pages).
ZTE Corporation: "R9 CR 32273 add multicast delivery related contents in MBMS charging", 3GPP Draft; S5-092829 R9 CR 32273 Add RAT Type in eMBMS Charging, 3rd Generation Partnership Project (3GPP), Mobile Competence Centre; 650, Route des Lucioles; F-06921 Sophia-Antipolis Cedex, France, no. Dublin, Ireland; Jun. 21, 2009. (2 pages—see Supplementary European Search Report in European application No. 10771967.6 for relevant pages).
ZTE Corporation et al: "TS 32.273 MBMS charging in EPS alignment in CDR description", 3GPP Draft; S5-092107 R9 CR 32273 MBMS Charging in EPS Alignment in CDR Description. 3RD Generation Partnership Project (3GPP), Mobile Competence Centre; 650, Route des Lucioles; F-06921 Sophia-Antipolis Cedex, France, no. Hangzhou; Apr. 2, 2009. (3 pages—see Supplementary European Search Report in European application No. 10771967.6 for relevant pages).
ZTE Corporation et al: "TS 32.273 MBMS charging in EPS alignment in Abbreviations and charging principle", 3GPP Draft; S5-092136 R9 CR 32273 MBMS Charging in EPS Alignment in Abbreviations and Charging Principle,3rd Generation Partnership Project (3GPP), Mobile Competence Centre; 650, Route des Lucioles; F-06921 Sophia-Antipolis Cedex, France, no. Hangzhou; Apr. 2, 2009. (9 pages—see Supplementary European Search Report in European application No. 10771967.6 for relevant pages).
Supplementary European Search Report in European application No. 10771967.6, mailed on Nov. 15, 2013. (12 pages—see entire document).

* cited by examiner

METHOD AND SYSTEM FOR OBTAINING ACCESS INFORMATION AND CHARGING IN MULTIMEDIA BROADCAST/MULTICAST SERVICE

TECHNICAL FIELD

The present invention relates to the field of communication networks, in particular to a method and system for obtaining access information and charging in a multimedia broadcast/multicast service.

BACKGROUND

A multimedia broadcast/multicast service in a mobile communication network is a service mode in which a path of service data is established in the existing radio communication network by multicast or broadcast technology to achieve a service mode of distributing a service from one point to multiple points. A Multimedia Broadcast/Multicast Service (MBMS) and evolved MBMS (eMBMS) defined in the radio communication standard organizations of $3^{rd}$ Generation Partnership Project (3GPP) are such services. For a radio communication network defined by 3GPP, so far, the defined radio access technologies related to the MBMS and the eMBMS include a Universal Terrestrial Radio Access Network (UTRAN) and an Evolved Universal Terrestrial Radio Access Network (E-UTRAN).

Figure 1:
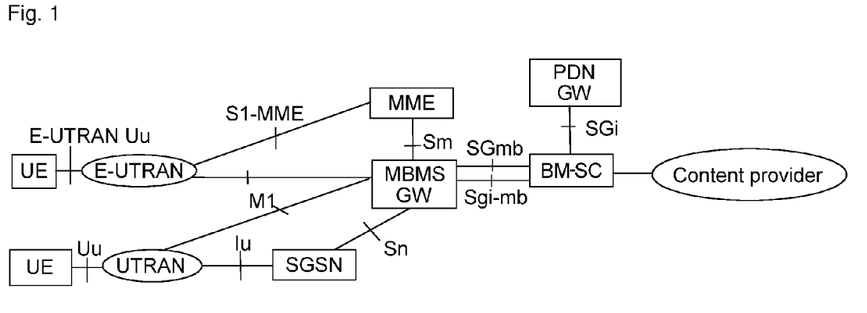
FIG. 1 shows a network architecture diagram of multimedia broadcast/multicast service mode.

Take the eMBMS for example, network architecture of a multimedia broadcast/multicast service mode defined by 3GPP is shown as FIG. 1. Wherein, a Broadcast/Multicast Service Center (BM-SC) is a service data source from which all the data are sent to other network nodes. An MBMS Gateway (MBMS GW) is a service data gateway for a core network of mobile communication; it is responsible for receiving all the MBMS data from service network elements and further transmitting them to the subsequent network nodes, which is called "transmitting to the downlink nodes" according to positions in the network diagram.

In order to establish the whole service path, before sending data, it is necessary to send relative signaling to all nodes in the downlink path from the service source to notify all nodes of the session identifier identifying the multicast address information of the service, addresses of all downlink nodes, Quality of Service (QoS), initiation time and a service area and other information. This signaling is defined as MBMS session starting signaling at present. Signaling at the end of service is MBMS session ending signaling used for releasing the path.

Information in the signaling is configured in the BM-SC (or a network management system). The BM-SC obtains these information and forms parameters of the session signaling when sends the signaling.

Figure 2:
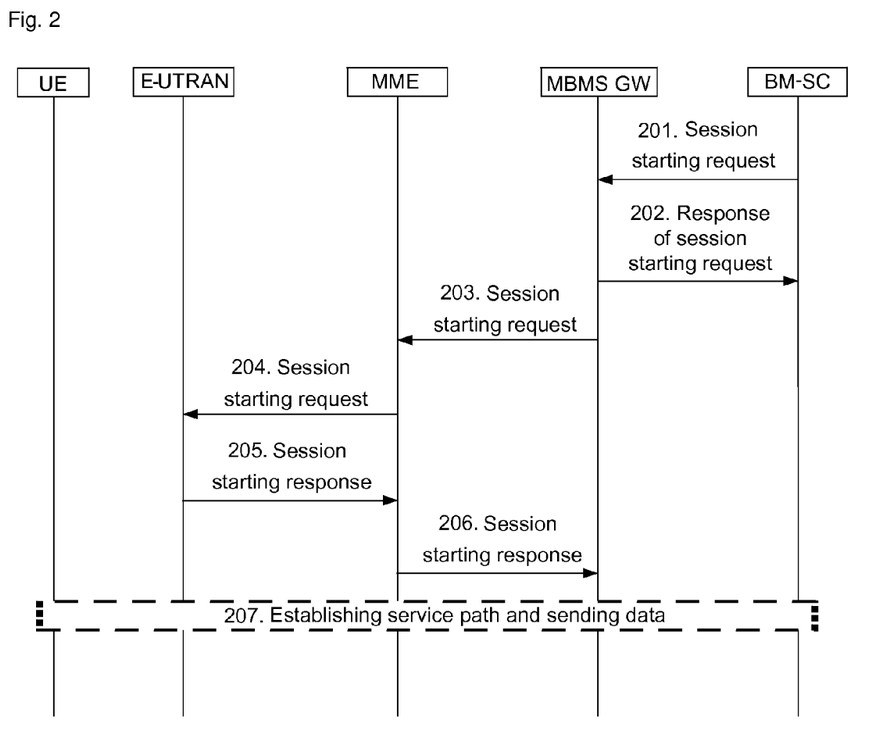
FIG. 2 shows a flow chart of eMBMS session starting process in the prior art.
Figure 3:
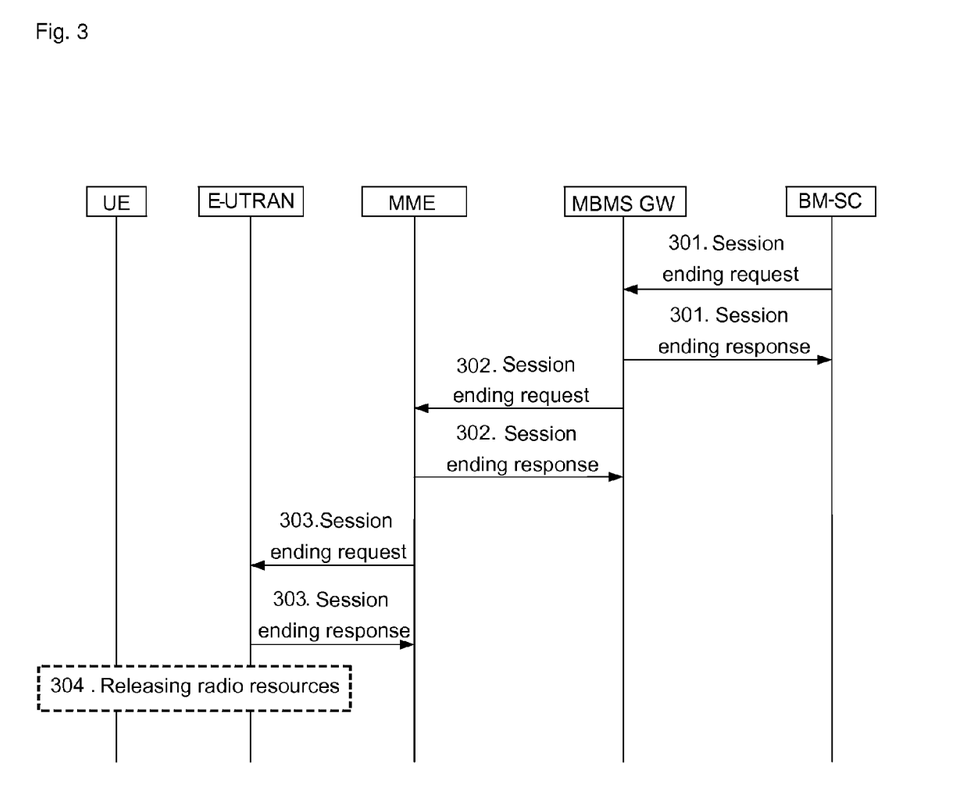
FIG. 3 shows a flow chart of eMBMS session ending process in the prior art.

Please refer to FIG. 2 and FIG. 3 for definitions of session starting signaling and session ending signaling.

The eMBMS is taken for example in both FIG. 2 and FIG. 3 to describe methods for sending session starting messages and session ending messages.

As shown in FIG. 2, the existing eMBMS session starting procedure includes the following steps:

step 201: a BM-SC sends an MBMS session starting request message to each MBMS GW;

the MBMS session starting request message can include session parameters and address parameters. Wherein, the session parameters include QoS, an MBMS service area list, an MBMS session identifier, estimated session duration and a destination network indicator (MBMS xG indicator) and so on; the address parameters include a downlink node address list (including address of the MBMS GW and a downlink node list of the MBMS GW) and so on;

step 202: the MBMS GW saves parameter information included in the message and returns a session starting response message to the BM-SC;

step 203: the MBMS GW sends an MBMS session starting request message to an MME (Mobility Management Entity);

step 204: the MME saves the information included in the message and sends the session starting request message to an E-UTRAN;

step 205: the E-UTRAN determines whether there is any cell belong to the service area and returns a session starting response message;

step 206: After receiving all session starting response messages from the E-UTRAN side, the MME sends the session starting response messages to the MBMS GW;

when a data acquisition function of a Charging Data Recorder (CDR) is activated by the MBMS GW, after receiving the session starting response messages, the MBMS GW sends a charging start request message (e.g. ACR[Start]) to the network elements related to the charging;

step 207: Reserving radio resources and establishing service paths, and sending data.

As shown in FIG. 3, the existing eMBMS session ending procedure includes the following steps:

step 301: the BM-SC sends an MBMS session ending request message to the MBMS GW; the message includes a session identifier, a service identifier and a downlink node list and so on; the MBMS GW returns a session ending response message to the BM-SC and releases information related to the service and saved by itself;

step 302: the MBMS GW transmits an MBMS session ending request message to an MME that has received the session starting message before, the MME returns a session ending response message and releases information that is related to the service and saved by itself;

when the data acquisition function of the CDR is activated by the MBMS GW, after receiving the session ending response messages, the MBMS GW sends a charging stop request message (e.g. ACR[Stop]) to a Charging Data Function (CDF);

303: the MME transmits the MBMS session ending request message to the E-UTRAN, and the E-UTRAN returns a session ending response message;

304: radio resources are released.

Distribution of multimedia broadcast/multicast service is limited to a certain area range and expressed by conception of Service Area (SA). Each SA is expressed by a series of Service Area Identifiers (SA ID) and each SA ID defines a series of radio cells (e.g. cell ID), therefore the position range of one specific SA is substantially corresponding to radio cells. One multimedia broadcast/multicast service can have one or more SAs to define the range.

Due to limit of the SA, from service source to downlink paths of radio access devices (such as, base station) in multimedia broadcast/multicast service are also definite. Therefore, for one SA, addresses of all downlink nodes are also definite. It should be noted that it is a heavy burden for signaling to send so many downlink node addresses as the number of radio access devices is huge. Therefore, the final level of downlink node address is an address of the upper level of radio access device instead of the address of the radio access device. The upper level of radio access device broadcasts the session signaling to all the connected radio access devices, if the radio access device does not belong to this SA, the radio access device returns an error message; when it belongs to this SA, the radio access device returns a path establish success message.

Generally, area ranges of SAs are configured in radio access devices, that is, which cells of radio devices belong to which the SA is achieved by configuration of radio access devices. The BM-SC has no need to know in which cell one service is to be played specifically, it only needs to know the corresponding SA or SA list; therefore, the BM-SC has to configure corresponding SA for each service. And it also needs to configure the address list of all downlink nodes.

After introduction of the E-UTRAN, there is another type for radio access technology. Different radio access technology type means different radio transmission quality and further provides different service transmission capacity and user experience. Compared with the UTRAN and earlier GRPS/EDGE Radio Access Network (GERAN), the E-UTRAN has greater bandwidth and higher data transmission stability and adapts to higher movement speed; during early stage of construction, it can be used in access points to relieve the network congestion. In this way, different radio access technologies can be corresponding to different multimedia broadcast/multicast services or to a same service to achieve different serving effects. A problem whether the radio access technology can be used as a distinguishing option of charging is caused.

Past MBMS charging of GPRS includes content-based charging and bearing-based charging. For bearing-based charging, charging vectors at present are time and flow of each service; and the charging unit is mainly in the BM-SC, namely, the service source. A Serving GPRS Support Node (SGSN) and a Gateway GPRS Support Node (GGSN) also achieve the collection of some charging vectors.

The eMBMS based on IP has two modes, i.e. broadcast mode and enhanced broadcast mode, but it has no multicast mode for users. Establishment of data path (namely, establishment of bearing) employs IP multicast protocol. The MBMS GW as a logic entity is introduced in the eMBMS; the MBMS GW can be used independently or arranged in the MB-SC or jointly arranged with a Serving Gateway (SGW)/Packet Data Network Gateway (PGW). Bearing-based charging is mainly completed on the network elements of mobile core network such as the MBMS GW; when receiving the relevant charging trigger events (such as, a MBMS session starting response message or a time interval message), the MBMS GW sends a charging request message including a service type, a service identifier, a service area, time, a flow and other information to the relevant entities of charging network gateway, such as CDF.

Corresponding to the change of eMBMS network architecture, content-based charging has little change, but bearing-based charging has great change along with change of the network architecture. The prior art is disadvantaged in that the current MBMS services can be sent to different Radio Access Technology Types (RAT Types) such as the UTRAN and the E-UTRAN, different radio access technology types can provide different access capacities for MBMS services, therefore the MBMS services can have different effects due to different radio access technology typed, even some MBMS services only can be accessed under radio access technology type with higher access capacity, thus the demand for distinguishing radio access technology types in terms of application and charging of services (including charging users and service providers) is arisen. However, the current MBMS charging and application solution fails to propose any method for distinguishing radio access technology types. Besides, radio access technologies as well as corresponding relationships between radio access technologies and related service areas and downlink nodes are also not described in the related technical specifications.

Introduction of the E-UTRAN also makes cells have some changes. Cells of the E-UTRAN are different from cells of the UTRAN in terms of number, which makes service area SA have UTRAN and E-UTRAN attributes. That is, the attribute of radio access technology of the SA can be determined due to whether the cell list contained in SA belongs to the UTRAN or the E-UTRAN or both the UTRAN and the E-UTRAN. At present, there is no configuration about radio access attribute of the SA in respect of configuration of the SA.

SUMMARY

The technical issue of the present invention is to provide a method and system for obtaining access information and charging in a multimedia broadcast/multicast service; the access information can be obtained and used as a basis of charging.

In order to solve the above technical issue, the present invention provides a method for obtaining access information in multimedia broadcast/multicast service (MBMS), the method comprises the following steps:

during an eMBMS session, a Broadcast/Multicast Service Center (BM-SC) configures access information in one or more MBMS session signaling, and sends the MBMS session signaling to an MBMS Gateway (MBMS GW) within a service area of the BM-SC;

wherein the access information at least includes radio access technology type information.

Further, the method may have the following feature:

the access information further includes MBMS service area information corresponding to the radio access technology type information.

Further, the method may have the following feature:

the access information further includes downlink node information corresponding to the service area.

Further, the method may have the following feature:

the BM-SC configures access information in an MBMS session starting request message and sends the MBMS session starting request message to the MBMS GW within the service area of the BM-SC;

when a data acquisition function of a Charging Data Recorder (CDR) is activated by the MBMS GW, the MBMS GW configures the access information in a charging start request message and sends the charging start request message to a Charging Data Function (CDF).

Further, the method may have the following feature:

the BM-SC configures the access information in an MBMS session ending request message and sends the MBMS session ending request message to the MBMS GW within the service area of the BM-SC;

when the data acquisition function of the CDR is activated by the MBMS GW, the MBMS GW configures the access information in a charging stop request message and sends the charging stop request message to the CDF.

In order to solve the above technical issue, the present invention provides a method for charging in a multimedia broadcast/multicast service, the method comprises the following steps:

after an eMBMS session starts, a BM-SC configures access information in a charging request message and sends the charging request message to a CDF; and the CDF generates charging record information of the eMBMS session for the BM-SC; wherein the charging record information includes the access information, and the access information at least includes radio access technology type information.

Further, the method may have the following feature:

the access information further includes MBMS service area information corresponding to the radio access technology type information.

Further, the method may have the following feature:

the access information further includes the downlink node information corresponding to the service area.

Further, the method may have the following feature:

when a data acquisition function of a CDR is activated by the MBMS GW, after the eMBMS session starts, the MBMS GW configures the access information in a charging start request message and sends the charging start request message to the CDF; and the CDF generates charging record information, which includes the access information, of the eMBMS session for the MBMS GW.

Further, the method may have the following feature:

when the eMBMS session ends, the BM-SC configures the access information in a charging stop request message and sends the charging stop request message to the CDF;

the CDF stops recording the charging record information of the eMBMS session for the BM-SC, and generates a charge bill, which includes the access information, of the eMBMS session for the BM-SC.

Further, the method may have the following feature:

when the data acquisition function of the CDR is activated by the MBMS GW, when the eMBMS session ends, the MBMS GW configures the access information in a charging stop request message and sends the charging stop request message to the CDF; and the CDF stops recording the charging record information of the eMBMS session for the MBMS GW, and generates a charge bill, which includes the access information, of the eMBMS session for the MBMS GW.

In order to solve the above technical issue, the present invention provides a system for obtaining access information in a multimedia broadcast/multicast service (MBMS), the system comprises: a BM-SC and an MBMS GW within a service area of the BM-SC, the BM-SC is arranged to configure access information in one or more MBMS session signaling and send the MBMS session signaling to the MBMS GW;

wherein the access information at least includes radio access technology type information.

Further, the system may have the following feature:

the access information further includes MBMS service area information corresponding to the radio access technology type information; or, the access information further includes MBMS service area information corresponding to the radio access technology type information and the downlink node information corresponding to the service area.

In order to solve the above technical issue, the present invention provides a system for charging in a multimedia broadcast/multicast service, the system comprises: a BM-SC and a CDF;

after an eMBMS session starts, the BM-SC is arranged to configure access information in a charging request message and send the charging request message to the CDF;

the CDF is arranged to generate charging record information, which includes the access information, of the eMBMS session for the BM-SC;

wherein the access information at least includes radio access technology type information.

Further, the system may have the following feature:

the access information further includes MBMS service area information corresponding to the radio access technology type information; or, the access information further includes MBMS service area information corresponding to the radio access technology type information and the downlink node information corresponding to a service area.

Further, the system may have the following feature:

the system further includes an MBMS GW within a service area of the BM-SC;

when a data acquisition function of a CDR is activated, the MBMS GW is arranged to configure the access information in a charging start request message after the eMBMS session starts, and send the charging start request message to the CDF;

the CDF is further arranged to generate charging record information, which includes the access information, of the eMBMS session for the MBMS GW.

Further, the system may have the following feature:

when the eMBMS session ends, the BM-SC is further arranged to configure the access information in a charging stop request message and send the charging stop request message to the CDF; and according to the charging stop request message, the CDF is further arranged to stop recording the charging record information of the eMBMS session for the BM-SC, and generate a charge bill, which includes the access information, of the eMBMS session for the BM-SC.

Further, the system may have the following feature:

when data acquisition function of CDR is activated, the MBMS GW is further arranged to configure the access information in a charging stop request message when the eMBMS session ends, and send the charging stop request message to the CDF;

the CDF is further arranged to generate a charge bill, which includes the access information, of the eMBMS session for the MBMS GW according to the charging stop request message.

Through the present invention, the access information that at least includes a radio access technology type (such as, the UTRAN and the E-UTRAN) can be obtained and used as the basis of charging. Therefore, the present invention can supply communication operators with a charging manner of distinguishing radio access technology types, and adopt different rates corresponding to the MBMS service areas of different radio access technology types, and thus charging can be further detailed.

DETAILED DESCRIPTION

In the present invention, access information that at least includes a radio access technology type is added in the multimedia broadcast/multicast service session signaling and the charging information sent to a CDF from a BM-SC, and used as the basis of charging, therefore the present invention can supply communication operators with a charging manner which can distinguish radio access technology types, and adopt different rates corresponding to the MBMS service areas of different radio access technology types, and thus charging can be further detailed.

The present invention provides a method for obtaining access information in multimedia broadcast/multicast service (MBMS), and the method comprises the following steps: during an eMBMS session, a Broadcast/Multicast Service Center (BM-SC) configures access information in one or more MBMS session signaling, and sends the MBMS session signaling to an MBMS Gateway (MBMS GW) within a service area of the BM-SC; the access information at least includes radio access technology type information.

The access information may further include MBMS service area information corresponding to the radio access technology type information.

The access information may further include downlink node information corresponding to the service area.

Wherein the BM-SC configures the access information in an MBMS session starting request message and sends the MBMS session starting request message to the MBMS GW within the service area of the BM-SC; when a data acquisition function of a Charging Data Recorder (CDR) is activated by the MBMS GW, the MBMS GW configures the access information in a charging start request message and sends the charging start request message to a Charging Data Function (CDF).

The BM-SC configures the access information in an MBMS session ending request message and sends the MBMS session ending request message to the MBMS GW within the service area of the BM-SC;

when the data acquisition function of the CDR is activated by the MBMS GW, the MBMS GW configures the access information in a charging stop request message and sends the charging stop request message to the CDF.

Specifically, if one multimedia broadcast/multicast service covers devices of multiple radio access technologies, it is necessary that all radio access technology types are included in the multimedia broadcast/multicast service session signaling.

Radio access technology types included in the session signaling can follow multiple corresponding service areas; and each service area can further correspond to multiple downlink nodes.

By configuring the SA with radio access technology type attribute, when an SA is selected in the session signaling, the radio access technology type of this service is selected.

The present invention further provides a method for charging in a multimedia broadcast/multicast service, the method comprises the following steps:

after an eMBMS session starts, a BM-SC configures the access information in a charging request message and sends the charging request message to a CDF;

the CDF generates charging record information of this MBMS session for the BM-SC, the charging record information includes the access information; and the access information at least includes radio access technology type information.

The access information may further include MBMS service area information corresponding to the radio access technology type information; the access information may further include the downlink node information corresponding to the service area.

When the data acquisition function of a CDR is activated by the MBMS GW, after an eMBMS session starts, the BM-SC configures the access information in a charging start request message and sends the charging start request message to the CDF; the CDF generates charging record information, which includes the access information, of this MBMS session for the MBMS GW.

When the eMBMS session ends, the BM-SC configures the access information in a charging stop request message and sends the charging stop request message to the CDF; the CDF stops recording the charging record information of this MBMS session for the BM-SC, and generates a charge bill, which includes the access information, of this MBMS session for the BM-SC.

When the data acquisition function of the CDR is activated by the MBMS GW, at the end of eMBMS session, the MBMS GW configures the access information in a charging stop request message and sends the charging stop request message to the CDF; the CDF stops recording the charging record information of this MBMS session for the MBMS GW, and generates a charge bill, which includes the access information, of this MBMS session for the MBMS GW.

For charging, the present invention proposes that the BM-MC sends a charging message to the CDF, the charging message includes access information, and the charging record information (namely, the CDR of the BM-SC) generated for the BM-SC by the CDF further includes the access information.

When the data acquisition function of the CDR of the MBMS GW is activated to send a charging message to the CDF, the charging message further includes access information, and the charging record information generated for the MBMS GW by the CDF further includes the access information.

The access information at least includes the radio access technology type information. The access information may include: only radio access technology type information; or radio access technology type information and its corresponding MBMS service area information; or radio access technology type information and corresponding MBMS service area information as well as downlink node information corresponding to the service area.

The radio access technology type information proposed in the present invention is subject to but not limited to types and specific values defined by 3GPP standard organization. Other types and corresponding values can be used in application of other radio mobile networks.

Establishment and end of session flow and charging flow in the present invention will be described in detail below in combination with drawings and embodiments.

Embodiment One

Adding a Radio Access Technology Type During an eMBMS Session Starting Process According to the background, it is necessary to complete the related configuration of information such as a service attribute parameter and an address parameter of the service before sending the session starting signaling. Compared with the prior art, the embodiment only adds radio technology type attribute in the configuration of the BM-SC to simply add the radio access technology type designed for the service in the related signaling, without any other changes; or adds the radio access technology type attribute of the service area in the configuration attribute of the service area so that adding of radio access technology type can be completed automatically when a service area is selected for a certain service. Similarly, the downlink node address list attribute of the service area can be added, that is, the service area automatically completes the adding of attribute of corresponding downlink node list in the signaling by configuring the corresponding downlink node list. In the embodiment, it is not limited that one service area can only have one radio technology type, that is, one service area can have multiple radio access technology type attributes at the same time.

Figure 4:
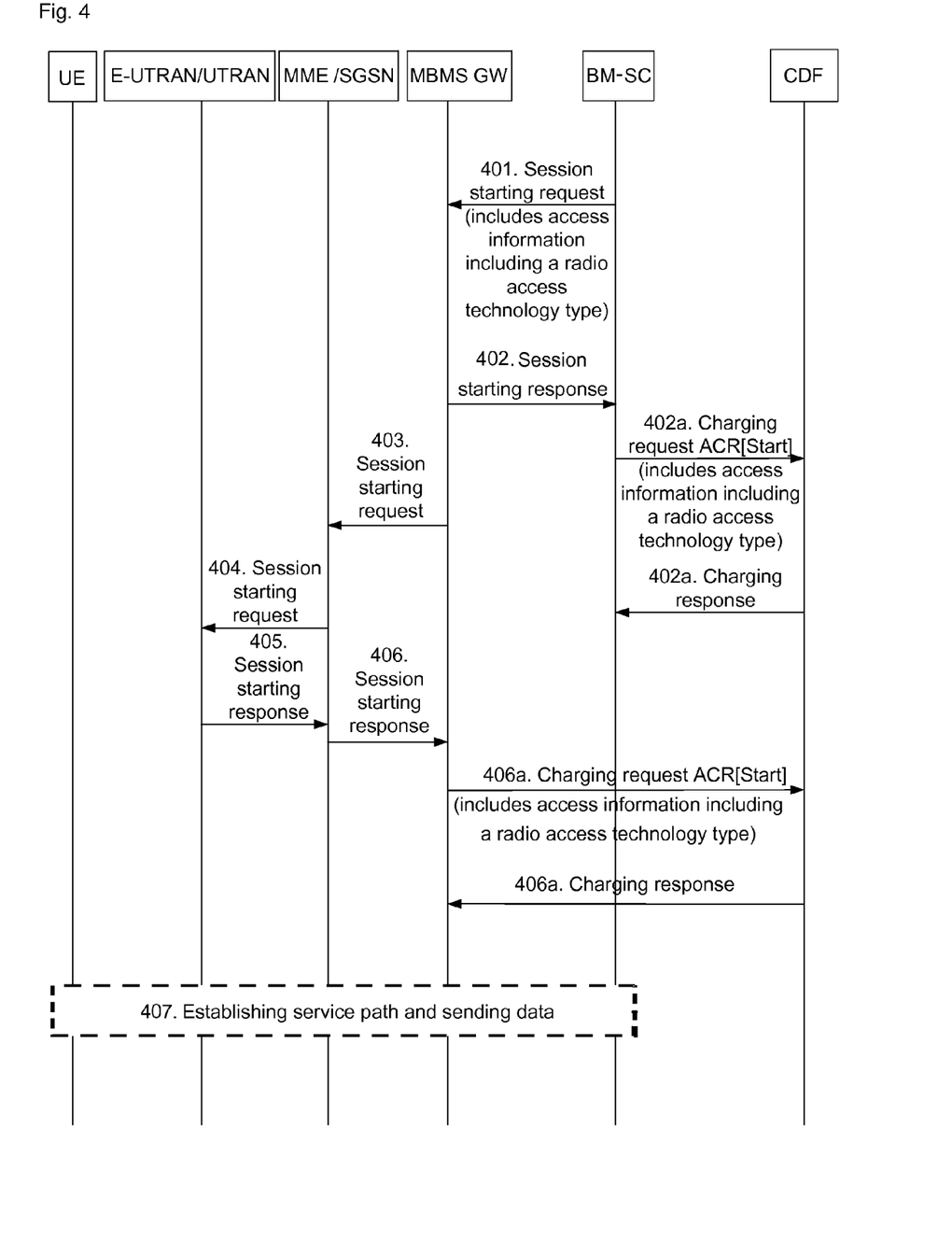
FIG. 4 shows a flow chart of adding radio access technology type information in an eMBMS session starting process in an embodiment of the present invention.

Selection of later session signaling flow chart is shown in FIG. 4. The embodiment of the present invention relates to two radio access technology types, i.e. a UTRAN and an E-UTRAN, the corresponding network elements of a core network include an SGSN, an MME and an MBMS GW.

step 401: a BM-SC sends an MBMS session starting request message to each MBMS GW;

the MBMS session starting request message includes QoS, a radio access technology type UTRAN and E-UTRAN, an MBMS service area list, an MBMS session identifier, estimated session duration and an MBMS xG indicator and so on;

step 402: the MBMS GW saves parameter information included in the message and returns a session starting response message to the BM-SC;

step 402a: After receiving the MBMS session starting response message from the MBMS GW, the BM-SC sends a charging request message to a CDF;

after receiving the session starting response message from any MBMS GW, the BM-SC sends a charging start request message (e.g. ACR[Start]) to the CDF;

the charging request message includes radio access technology type information;

the CDF generates charging record information (e.g. CDR) of this MBMS session for the BM-SC, and the charging record information includes radio access technology type information. Specifically, ACR[Start] message triggers the CDF to open the charge bill (e.g. C-BMSC-CDR) generated for the BM-SC corresponding to this MBMS session and to start recording the charging information of this MBMS session for the BM-SC; the CDR includes many parameter information, in which the radio access technology type information is included; the CDF feeds a charging response message back to the BM-SC;

step 403: the MBMS GW sends an MBMS session starting request message to an MME and an SGSN, respectively;

it should be noted that the session starting request message in this step could be transmitted to the MME and the SGSN intact according to the received message; or transmitted to the MME and the SGSN according to the prior art after radio access technology type is removed; or the session starting request message included the type of E-UTRAN sent to the MME and the session starting request message included the type of UTRAN sent to the SGSN, other parameters are remained. The three cases can be respectively achieved by three embodiments. No specific description will be given as they are not the issues to be solved in the present invention;

step 404: the MME saves the information included in the session starting request message and sends the session starting request message to the E-UTRAN; if the radio access technology type parameter is included in the session starting request message form the step 403, the parameter can be removed from the session starting request message or remained. The SGSN saves the information included in the session starting request message and sends the session starting request message to the UTRAN, wherein the processing of radio access technology type is similar to the MME;

step 405: the E-UTRAN/UTRAN determines whether there is any cell belonging to the service area, and returns a response message of the session starting request;

step 406: After receiving all response messages of the session starting request from the E-UTRAN/UTRAN side, the MME/SGSN sends a session starting response message to the MBMS GW;

step 406a: when a data acquisition function of a CDR is activated by the MBMS GW, after receiving the session starting response message, the MBMS GW sends a charging start request message (e.g. ACR[Start]) to the corresponding logic function entities of the charging gateway, such as a CDF, the message includes radio access technology type information;

the CDF generates charging record information (e.g. CDR) of this MBMS session for the MBMS GW, the charging record information includes radio access technology type information, Specifically, the CDF opens the charge bill (e.g. MBMS-GW-CDR) of this session generated for the MBMS GW and feeds a charging response message back to the MBMS GW;

the MBMS-GW-CDR includes Radio Access Technology Type (RAT Type) information and so on;

step 407: radio resources are reserved, service paths are established, and data are sent.

Wherein, step 402a and step 403 can be executed in parallel.

During the eMBMS session, the CDF updates the information recorded in C-BMSC-CDR and MBMS-GW-CDR according to session condition.

The Radio Access Technology Type (RAT Type) information proposed in the present invention is subject to but not limited to types and specific values defined by 3GPP standard organization. Other types and corresponding values can be used in application of other radio mobile networks. This description is effective for follow embodiments.

Embodiment Two

Adding a Radio Access Technology Type During an eMBMS Session Ending Process

Figure 5:
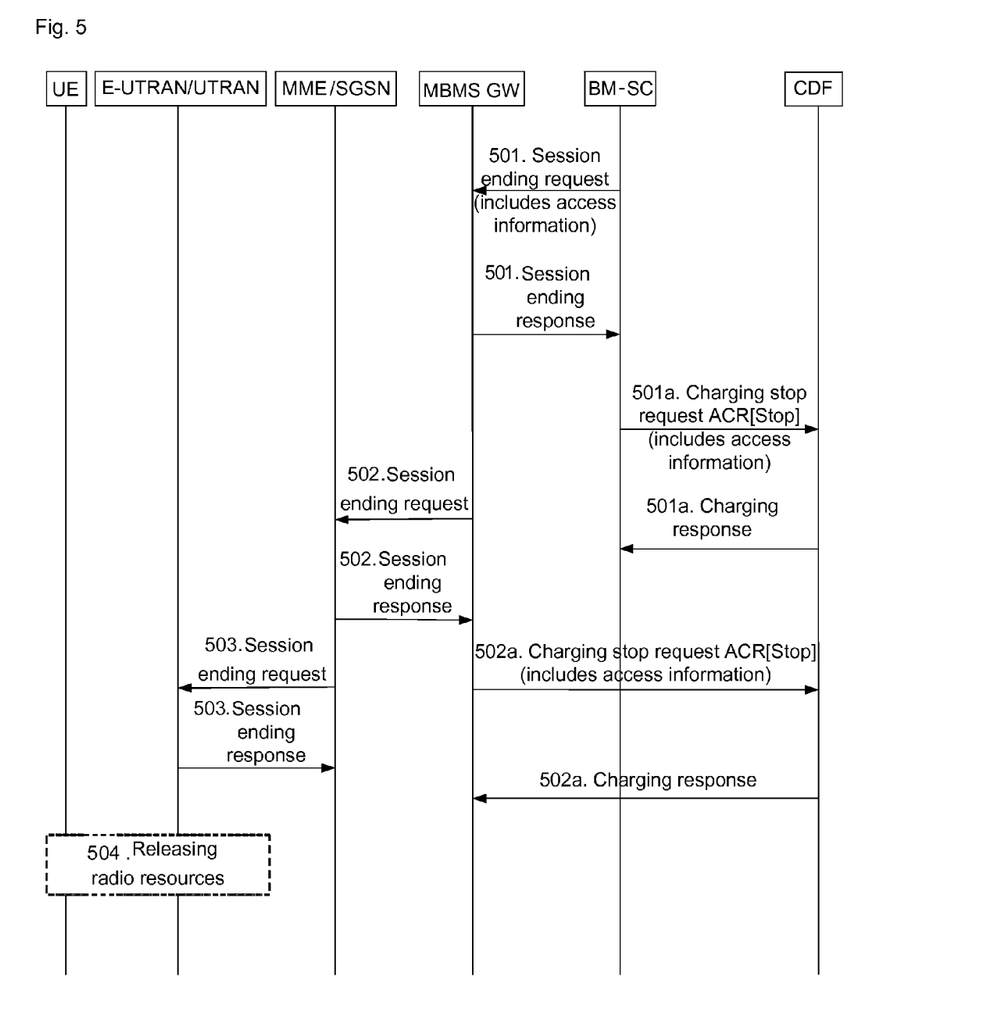
FIG. 5 shows a flow chart of adding radio access technology type information in an eMBMS session ending process in an embodiment of the present invention.

As shown in FIG. 5, when the service ends, the BM-SC initializes a session ending signaling flow.

step 501: the BM-SC sends an MBMS session ending request message to the MBMS GW; the message includes a session identifier, a service identifier, a radio access technology type, a service area, a downlink node list and other information; the MBMS GW returns a session ending response message to the BM-SC and releases information related to the service and saved by itself;

Stop 501a: After receiving the MBMS session ending response message from the MBMS GW, the BM-SC sends a charging stop request message to the CDF;

wherein the charging stop request message sent by the BM-SC includes radio access technology type information;

after receiving the session ending response message from any MBMS GW, the BM-SC sends a charging stop request message (e.g. ACR[Stop]) to the CDF;

the CDF stops recording the charging record information of this MBMS session for the BM-SC, and generates a charge bill of this MBMS session for the BM-SC. Specifically, the CDF closes the open charge bill (e.g. C-BMSC-CDR) of this session generated for the BM-SC (that is, generates a final charge bill C-BMSC-CDR of this session for the BM-SC), and feeds a charging response message back to the BM-SC; wherein the charge bill includes radio access technology type information;

step 502: the MBMS GW transmits an MBMS session ending request message to an MME/SGSN that has received the session starting message before, the MME/SGSN respectively returns a response message, the MBMS releases the information that is related to the service and saved by itself after receiving the response message;

step 502a: when the data acquisition function of the CDR is activated by the MBMS GW, after receiving the session ending response message, the MBMS GW sends a charging stop request message (e.g. ACR[Stop]) to the CDF;

the charging stop request message includes a Radio Access Technology Type (RAT Type);

the CDF closes the opened charge bill (e.g. MBMS-GW-CDR), which includes the Radio Access Technology Type (RAT Type), of this session generated for the MBMS GW, and feeds a charging response message back to the MBMS GW.

step 503: the MME/SGSN respectively transmits the information to an E-UTRAN/UTRAN, the E-UTRAN/UTRAN returns a session ending response message, the MME/SGSN releases the session information saved by itself after receiving the session ending response message;

step 504: radio resources are released.

Wherein step 501a and step 502 can be executed in parallel; and step 502a and step 503 can be executed in parallel;

it should be noted that, with respect to the processing of radio access technology type, radio access technology type can be not included in the session ending information, that is, the original technology is retained. The MBMS GW can obtain a type value from the saved information when sends the charging stop request to the CDF.

Embodiment Three

Adding a Radio Access Technology Type, a Corresponding Service Area and a Corresponding Downlink Node List in an eMBMS Session Starting Process In the embodiment, a radio access technology type attribute of this service area and a downlink node list attribute of this service area are added within the service area. Thus, when a service area is selected for a certain multimedia broadcast/multicast service, selection of the radio access technology and downlink node list is completed automatically. In the embodiment, it is not allowed that one service area has multiple radio access technology types, that is, one service area can only have one radio access technology type.

Figure 6:
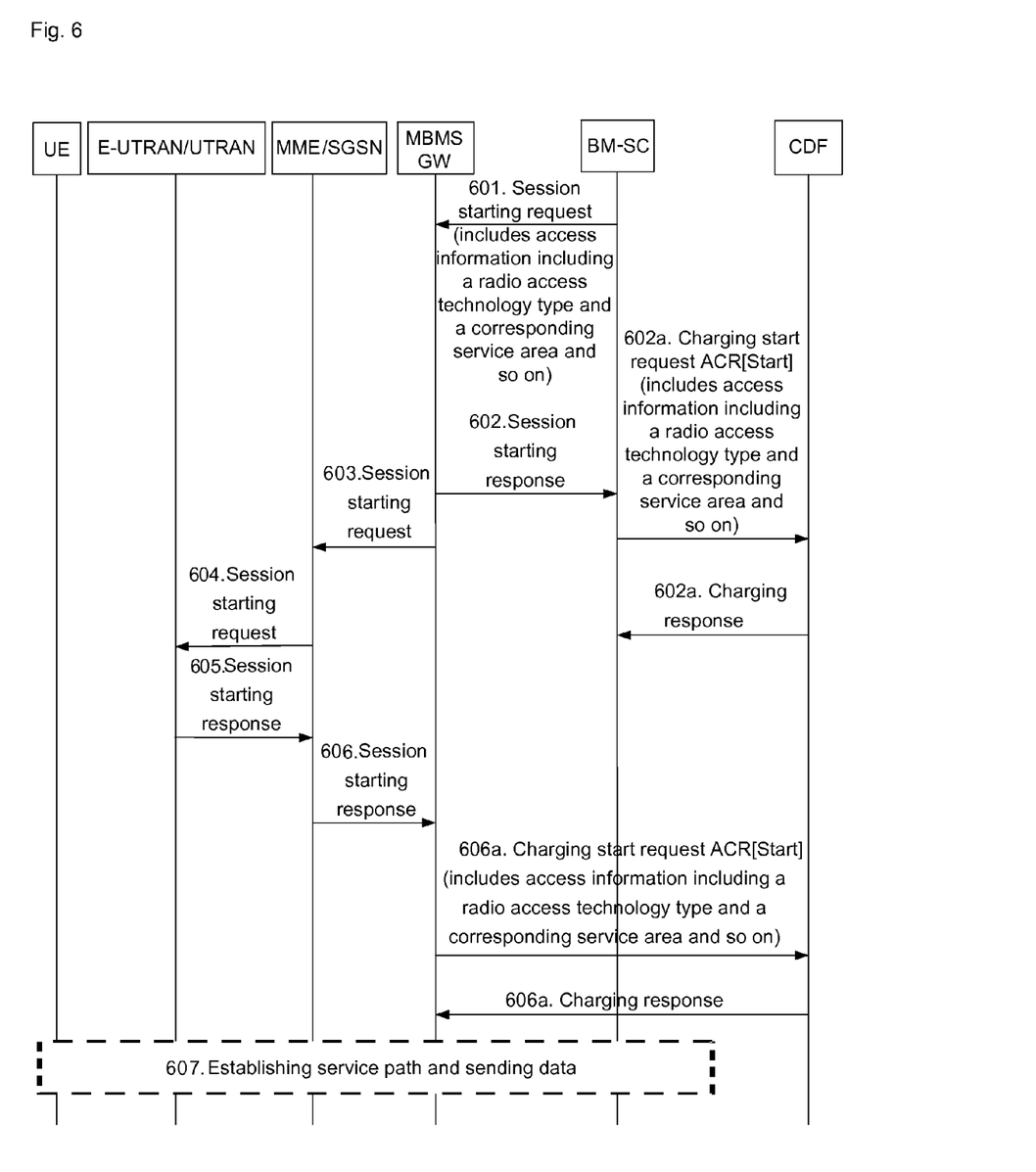
FIG. 6 shows a flow chart of adding radio access technology type information and the corresponding service area in an eMBMS session starting process in an embodiment of the present invention.

In the embodiment of the present invention, for a certain MBMS service, its application range relates to two radio access technologies such as the UTRAN and the E-UTRAN, it has three service areas such as SA1, SA101 and SA102, wherein SA101 and SA102 belong to a radio technology cover range of the E-UTRAN, SA101 has downlink nodes such as MBMS GW1 and MME1, SA102 has downlink nodes such as MBMS GW1 and MME2; SA1 belongs to radio technology cover range of the UTRAN and has downlink nodes such as MBMS GW1, SGSN1 and SGSN2. In this way, the session starting request sent by the BM-SC includes service areas SA1, SA101 and SA102, which means that it includes two radio access ways i.e. the UTRAN and the E-UTRAN, and includes the downlink node MBMS GW1 and the downlink node list of MBMS GW1, wherein the downlink node list includes: SGSN1, SGSN2, MME1 and MME2. The session flow diagram is shown in FIG. 6.

Step 601: a BM-SC sends an MBMS session starting request message to each MBMS GW;

wherein session parameters included in the MBMS session starting request message include Qos, an MBMS session identifier, estimated session duration and an MBMS xG indicator and so on; and address parameters included in the MBMS session starting request message include:

the radio access technology type UTRAN, the service area SA1 under the UTRAN, the downlink node address MBMS GW1, and a downlink node address list (SGSN1, SGSN2) of MBMS GW1; and the radio access technology type E-UTRAN, the service areas SA101 and SA102 under the E-UTRAN, the downlink node address of MBMS GW1, and a downlink node address list (MME1, MME2) of MBMS GW1 and so on;

it should be noted that parameters in the MBMS session starting request message are grouped according to radio technology type to reduce transmission of parameter information when subsequent signaling is transmitted.

Step 602: the MBMS GW saves parameter information included in the message and returns a session starting response message to the BM-SC;

Step 602a: after receiving the MBMS session starting response message from the MBMS GW, the BM-SC sends a charging request message to the CDF;

after receiving the session starting response message from any MBMS GW, the BM-SC sends a charging start request message (e.g. ACR[Start]) to the CDF;

the charging request message includes radio access technology type information, and corresponding service area information and downlink node address list information and so on, namely:

the radio access technology type UTRAN, the service area SA1 under the UTRAN, downlink node address MBMS GW1, and downlink node address list (SGSN1, SGSN2) of MBMS GW1, the radio access technology type E-UTRAN, the service areas SA101 and SA102 under the E-UTRAN, the downlink node address MBMS GW1, and downlink node address list (MME1, MME2) of MBMS GW1 and so on;

the CDF generates charging record information (such as the CDR) of this MBMS session for the BM-SC, and the charging record information includes above information. Specifically, ACR[Start] message triggers the CDF to open the charge bill (e.g. C-BMSC-CDR) generated for the BM-SC corresponding to this MBMS session and to start recording the charging information of this MBMS session for the BM-SC; the CDR includes above information; the CDF feeds a charging response message back to the BM-SC.

Step 603: the MBMS GW sends an MBMS session starting request message (including the session attribute parameters) to the MME and the SGSN in the downlink address list, respectively;

it should be noted that the session starting request message in step 603 can be transmitted according to the radio access technology type, for example, the session starting request message only needs to include an SA list under the UTRAN-like when it is sent to UTRAN-like downlink nodes. Signaling sent to the E-UTRAN may not include target network 2G/3G indicator.

Step 604: the MME saves the session parameter information included in the message and sends the session starting request message to the E-UTRAN; if radio access technology type parameter is included in the session starting request message from the step 603, this parameter can be removed from the message or retained. the SGSN saves the information included in the message and sends the session starting request message to the UTRAN, and the processing of radio access technology type is similar to the MME.

Step 605: the E-UTRAN/UTRAN determines whether there is any cell belonging to the service area and returns a session starting response message;

Step 606: after receiving all session starting response messages from the E-UTRAN/UTRAN side, the MME/SGSN sends the session starting response messages to the MBMS GW;

Step 606a: when a data acquisition function of a CDR is activated by the MBMS GW, after receiving the session starting response message, the MBMS GW sends a charging start request message (e.g. ACR[Start]) to the corresponding logic function entities of the charging gateway, such as a CDF, the message includes the radio access technology type, and the corresponding service area and the downlink node address list information;

the CDF generates charging record information (e.g. CDR) of this MBMS session for the MBMS GW, the charging record information includes the radio access technology type, and the corresponding service area and the downlink node address list information; specifically, the CDF opens the charge bill (e.g. MBMS-GW-CDR) of this session generated for the MBMS GW and feeds a charging response message back to the MBMS GW;

the MBMS-GW-CDR includes the radio access technology type, and the corresponding service area and the downlink node address list information.

Step 607: radio resources are reserved, downlink paths are established, and data are sent.

Wherein step 602a and step 603 can be executed in parallel.

During the eMBMS session, the CDF updates the information recorded in C-BMSC-CDR and MBMS-GW-CDR according to session condition.

In an embodiment of the present invention, the system for obtaining access information in multimedia broadcast/multicast service comprises a BM-SC and an MBMS GW within a service area of the BM-SC, the BM-SC is arranged to configure the access information in one or more MBMS session signaling in an eMBMS session process, and send the MBMS session signaling to the MBMS GW; wherein the access information at least includes radio access technology type information. The access information further includes MBMS service area information corresponding to the radio access technology type information; the access information may further include downlink node information corresponding to the service area.

In an embodiment of the present invention, the system for charging in multimedia broadcast/multicast service comprises a BM-SC, a CDF and an MBMS GW within the service area of the BM-SC, the BM-SC is arranged to configure access information in a charging request message after an eMBMS session starts, and send the charging request message to the CDF; the CDF is arranged to generate charging record information of this MBMS session for the BM-SC, the charging record information includes the access information; wherein the access information at least includes radio access technology type information. The access information further includes MBMS service area information corresponding to the radio access technology type information; the access information may further comprise downlink node information corresponding to the service area.

When a data acquisition function of a CDR is activated, the MBMS GW is arranged to configure the access information in a charging start request message after an eMBMS session starts, and send the charging start request message to the CDF;

the CDF is further arranged to generate charging record information, which includes the access information, of this MBMS session for the MBMS GW.

When the eMBMS session ends, the BM-SC is further arranged to configure the access information in a charging stop request message and send the charging stop request message to the CDF;

According to the charging stop request message, the CDF is further arranged to stop recording the charging record information of this MBMS session for the BM-SC, and generate a charge bill, which includes the access information, of this MBMS session for the BM-SC.

When the data acquisition function of the CDR is activated, the MBMS GW is further arranged to configure the access information in a charging stop request message when the eMBMS session ends, and send the charging stop request message to the CDF; the CDF is further arranged to generate a charge bill, which includes the access information, of this MBMS session for the MBMS GW according to the charging stop request message.

When different rates are set for different Radio Access Technology Type (RAT Type) information and MBMS service areas, it helps the communication operators to achieve more detailed and more flexible bearing-based charging for content providers.

In conclusion, through the embodiments of the present invention, an eMBMS bearing offline charging method of content providers under an eMBMS broadcast mode is provided, by which the communication operators can achieve bearing-based charging of content providers in the eMBMS service, and the method is detailed to allow the communication operators to set different rates according to different radio access technologies and to charge according to different MBMS service area lists, thereby helping the communication operators and content providers to allocate charging of eMBMS services.

Of course, the present invention can further have many other embodiments, those skilled in this art can make many corresponding modifications and replacements according to the present invention within the spirit and principle of the present invention, but those corresponding modifications and replacements shall fall within the scope of protection of the present invention.

The invention claimed is:

1. A method for charging in a multimedia broadcast/multicast service, comprising:
after an evolved Multimedia Broadcast/Multicast Service (eMBMS) session starts, a Broadcast/Multicast Service Center (BM-SC) configuring access information in a charging request message and sending the charging request message with the access information to a Charging Data Function (CDF), wherein the access information at least includes radio access technology type information; and
the CDF generating charging record information of the eMBMS session for the BM-SC according to the radio access technology type information, wherein the charging record information includes the access information;
the method further comprises:
when a data acquisition function of a Charging Data Recorder (CDR) is activated by an MBMS Gateway (MBMS GW), after the eMBMS session starts, the MBMS GW configures the access information in a charging start request message and sends the charging start request message to the CDF; and the CDF generates charging record information, which includes the access information, of the eMBMS session for the MBMS GW.

2. The method according to claim 1, wherein
the access information further includes MBMS service area information corresponding to the radio access technology type information.

3. The method according to claim 2, wherein
the access information further includes the downlink node information corresponding to the service area.

4. The method according to claim 3, wherein
when the eMBMS session ends, the BM-SC configures the access information in a charging stop request message and sends the charging stop request message to the CDF; and the CDF stops recording the charging record information of the eMBMS session for the BM-SC, and generates a charge bill, which includes the access information, of the eMBMS session for the BM-SC.

5. The method according to claim 4, wherein
when a data acquisition function of a CDR is activated by the MBMS GW, the MBMS GW configures the access information in a charging stop request message when the eMBMS session ends, and sends the charging stop request message to the CDF; and the CDF stops recording the charging record information of the eMBMS session for the MBMS GW, and generates a charge bill, which includes the access information, of the eMBMS session for the MBMS GW.

6. The method according to claim 2, wherein
when the eMBMS session ends, the BM-SC configures the access information in a charging stop request message and sends the charging stop request message to the CDF; and the CDF stops recording the charging record information of the eMBMS session for the BM-SC, and generates a charge bill, which includes the access information, of the eMBMS session for the BM-SC.

7. The method according to claim 6, wherein
when a data acquisition function of a CDR is activated by the MBMS GW, the MBMS GW configures the access information in a charging stop request message when the eMBMS session ends, and sends the charging stop request message to the CDF; and the CDF stops recording the charging record information of the eMBMS session for the MBMS GW, and generates a charge bill, which includes the access information, of the eMBMS session for the MBMS GW.

8. The method according to claim 1, wherein
when the eMBMS session ends, the BM-SC configures the access information in a charging stop request message and sends the charging stop request message to the CDF; and the CDF stops recording the charging record information of the eMBMS session for the BM-SC, and generates a charge bill, which includes the access information, of the eMBMS session for the BM-SC.

9. The method according to claim 8, wherein
when a data acquisition function of a CDR is activated by the MBMS GW, the MBMS GW configures the access information in a charging stop request message when the eMBMS session ends, and sends the charging stop request message to the CDF; and the CDF stops recording the charging record information of the eMBMS session for the MBMS GW, and generates a charge bill, which includes the access information, of the eMBMS session for the MBMS GW.

10. A system for charging in a multimedia broadcast/multicast service, comprising: a Broadcast/Multicast Service Center (BM-SC) and a Charging Data Function (CDF);

after an evolved Multimedia Broadcast/Multicast Service (eMBMS) session starts, the BM-SC to configures access information in a charging request message and sends the charging request message with the access information to the CDF, wherein the access information at least includes radio access technology type information; and the CDF to generates charging record information of the eMBMS session for the BM-SC according to the radio access technology type information, wherein the charging record information includes the access information;

the system further comprises an MBMS Gateway (MBMS GW) within a service area of the BM-SC, wherein when a data acquisition function of a Charging Data Recorder (CDR) is activated, the MBMS GW configures the access information in a charging start request message after the eMBMS session starts, and sends the charging start request message to the CDF; and the CDF generates charging record information, which includes the access information, of the eMBMS session for the MBMS GW.

11. The system according to claim 10, wherein
the access information further includes MBMS service area information corresponding to the radio access technology type information; or, the access information further includes MBMS service area information corresponding to the radio access technology type information and the downlink node information corresponding to a service area.

12. The system according to claim 11, wherein
when the eMBMS session ends, the BM-SC configures the access information in a charging stop request message and sends the charging stop request message to the CDF; and according to the charging stop request message, the CDF stops recording the charging record information of the eMBMS session for the BM-SC, and generates a charge bill, which includes the access information, of the eMBMS session for the BM-SC.

13. The system according to claim 12, wherein
when a data acquisition function of a CDR is activated, the MBMS GW configures the access information in a charging stop request message when the eMBMS session ends, and sends the charging stop request message to the CDF; and the CDF generates a charge bill, which includes the access information, of the eMBMS session for the MBMS GW according to the charging stop request message.

14. The system according to claim 10, wherein
when the eMBMS session ends, the BM-SC configures the access information in a charging stop request message and sends the charging stop request message to the CDF; and according to the charging stop request message, the CDF stops recording the charging record information of the eMBMS session for the BM-SC, and generates a charge bill, which includes the access information, of the eMBMS session for the BM-SC.

15. The system according to claim 14, wherein
when a data acquisition function of a CDR is activated, the MBMS GW configures the access information in a charging stop request message when the eMBMS session ends, and sends the charging stop request message to the CDF; and the CDF generates a charge bill, which includes the access information, of the eMBMS session for the MBMS GW according to the charging stop request message.

* * * * *